United States Patent [19]

Puechavy

[11] 4,225,158
[45] Sep. 30, 1980

[54] FLEXIBLE HOSES

[75] Inventor: Daniel Puechavy, Clermont-Ferrand, France

[73] Assignee: Pneumatiques Caoutchouc Manufacture et Plastiques Kleber-Colombes, Colombes, France

[21] Appl. No.: 879,754

[22] Filed: Feb. 21, 1978

[51] Int. Cl.² ............................................. F16L 11/12
[52] U.S. Cl. ...................................... 285/47; 285/55; 285/149; 285/239; 285/DIG. 16; 285/363
[58] Field of Search ............... 285/149, 423, 234, 405, 285/47–55, DIG. 16, 363; 138/109

[56] References Cited

U.S. PATENT DOCUMENTS 3,278,202  10/1966  Smith ..................................... 285/50

FOREIGN PATENT DOCUMENTS 767492    5/1971  Belgium ................................. 285/239
2210612   9/1973  Fed. Rep. of Germany ............. 285/55
2292922   6/1976  Fed. Rep. of Germany ........... 285/149
2608703   8/1977  Fed. Rep. of Germany ........... 285/423
79644     5/1971  German Democratic Rep. ....... 285/55
878599   10/1961  United Kingdom ..................... 285/239

Primary Examiner—Dave W. Arola
Attorney, Agent, or Firm—Brisebois & Kruger

[57] ABSTRACT

This invention relates to flexible hoses having a rubber body and a flange at each end thereof. The rubber body is strengthened by a reinforcement comprising continuous metal elements extending from one flange to the other and whose ohmic resistance from flange to flange needs to be high. The surfaces, of said flanges situated facing the metal elements of the reinforcement are covered with an insulating layer formed from a glass cloth having high mechanical strength and high electrical resistance and from a firm binder of high electrical resistance comprising an epoxy resin, the insulating layer adhering to the metal surfaces of the flanges and to the rubber body of the hose. The layer of glass cloth preferably consists of a plurality of plies which are superimposed and having filaments whose respective axes are at an angle of 45°.

2 Claims, 2 Drawing Figures

FLEXIBLE HOSES

BACKGROUND OF THE INVENTION

The present invention relates to flexible hoses having a reinforcement which includes continuous metal element such as wires, stranded wires or cables which extend from one flange to the other.

The invention is especially applicable to hoses having so-called integrated flanges. Integrated flanges are placed in position and connected to the reinforcement of the hose when the hose is being manufactured. When the hose has been vulcanised, the flanges become integralised therewith.

When the hoses have reinforcements containing continuous metal elements and are provided with metal flanges connected to such reinforcements, their electrical resistivity measured from flange to flange is extremely low. For example, certain hoses intended to convey petroleum products under difficult conditions have a reinforcement formed from metal cables and are provided with integrated flanges. The ohmic resistance of such hoses, measured from flange to flange, is extremely low, of the order of a few thousandths of an ohm. However, so that there shall be no dange of sparking and thus of explosion, or so that the cathodic protection against corrosion provided for the installations will not be interfered with, it appears desirable for hoses intended for applications of this kind to have an electrical resistance between their flanges which, when measured on an ohmmeter, is greater than 25,000 ohms, or again which is such that an electric lamp will not light when an electrical circuit is set up comprising the hose, the said lamp and a 4.5 volts source of DC electrical current.

It is an object of the invention to overcome or minimise these drawbacks and provide a flexible hose whose electrical resistance is sufficiently high for there to be no risk of sparking even if the reinforcement of the hose includes continuous metal elements which extend from one flange to the other and even if these metal elements come into contact with the flange or come very close to it.

The invention is based on the surprising discovery that if the parts of the metal flange adjacent the metal elements of the reinforcement are covered with a layer of a resin which is known to be an electrical insulator, the electrical resistance of the hose remains low, but on the other hand it becomes extremely high and reaches the required levels if a fibrous material of high mechanical strength and high electrical resistivity is associated with the resin.

SUMMARY OF THE INVENTION

The invention consists in a flexible hose having a rubber body and a metal connecting flange at each end of said body, said rubber body being strengthened by a reinforcement comprising continuous metal elements extending from one said end flange to the other said end flange, wherein the surfaces of said flanges situated facing said metal elements of said reinforcement are covered with an insulating layer formed from a glass cloth having high mechanical strength and high electrical resistance and from a firm binder of high electrical resistance comprising an epoxyresin, said insulating layer adhering to said metal surfaces of said flanges and to said reinforcing metal elements embedded in said rubber body of the hose.

BRIEF DESCRIPTION OF THE DRAWINGS

In order that the invention may be more clearly understood, reference will now be made to the accompanying drawings which show two embodiments thereof by way of example and in which.

In the Figures, the same reference numerals refer to similar items.

Figure 1:
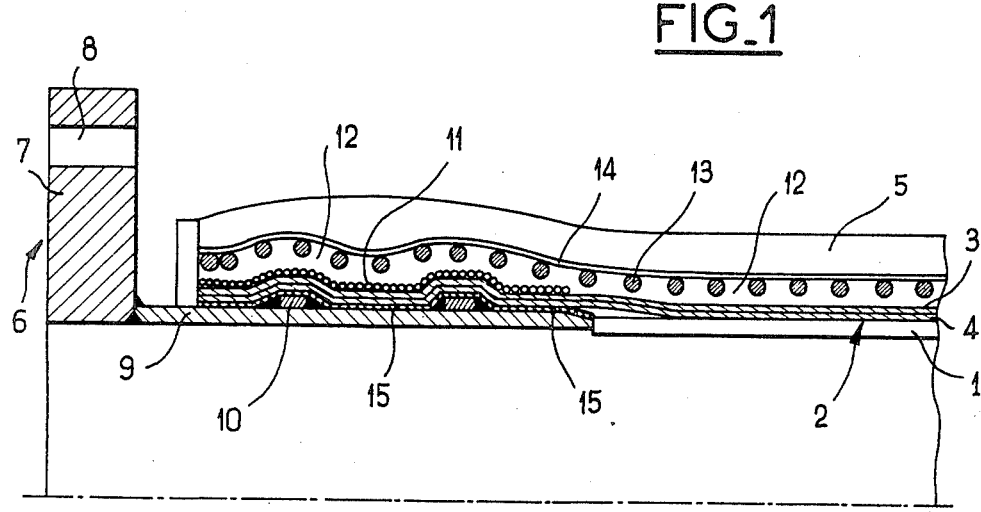
FIG. 1 is a schematic view in axial section of part of a hose fitted with a first embodiment of flange.
Figure 2:
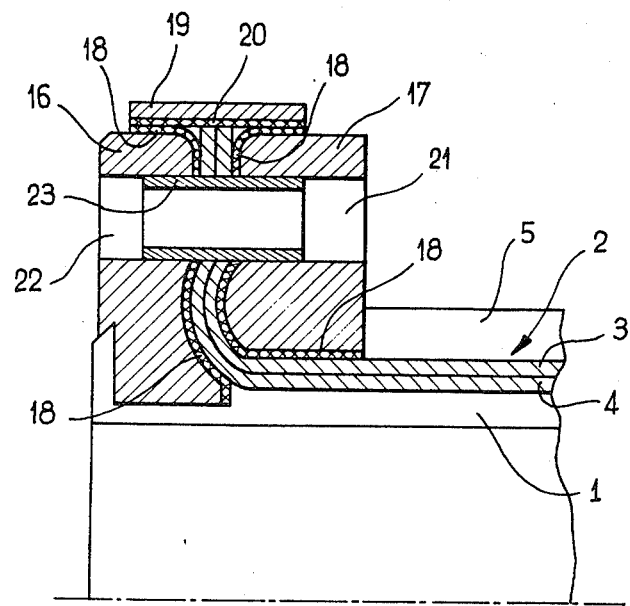
FIG. 2 shows a schematic view in axial section of part of another hose with a second embodiment of flange.

Referring now to the drawings, each of the hoses, part of which are shown in FIGS. 1 and 2, is formed in essence by an inner layer 1 or tube made of an elastomer of a kind suited to the fluid to be conveyed, a reinforcement 2 formed from two plies 3 and 4 of metal cables, and an outer layer 5 or cover.

In the embodiment shown in FIG. 1 an end flange 6 is formed by a ring or collar 7 perpendicular to the axis of the hose which is provided with cylindrical openings 8 through which attachment bolts pass, for attaching adjacent hose sections together, and by a cylindrical ferrule 9 co-axial with the hose which is welded to the collar 7. The cylindrical ferrule includes radially-projecting rings 10.

During manufacture of the hose, the reinforcement 2 was wound on top of the tube 1 and on top of the cylindrical ferrule 9 and then a ply 11 of metal cables was wound so that the convolution planes thereof were almost perpendicular to the axis of the hose over the part of the reinforcement situated above, i.e. around, the ferrule 9, to form a kind of confining hoop. A layer of rubber 12 was then applied and above this layer a steel wire 13 of relatively large diameter was coiled helically. Around the helix 13 was placed a fabric ply 14 and then the cover 5 was placed in position. A rubber bead was fitted to the end of the hose and the whole was then strapped and vulcanised.

After vulcanisation, the flange, which is very firmly connected to the reinforcement of the hose, is then integralised with it i.e. becomes an actual part of it.

If no precautions are taken, the electrical resistance of such a hose, which is provided with a similar flange at either end, is extremely low. The same is true if the walls of the flange are covered with even a relatively thick layer of an electrically insulating resin, such as an expoxy resin for example.

The invention consists in covering at least those parts of the flange adjacent the metal elements of the reinforcement with a layer 15 which is formed from a fibrous material which, like glass cloth, has high mechnical strength and electrical resistance and which is embedded in a firm or solid and electrically insulating binder such as an epoxy resin.

In the embodiment of FIG. 1, the layer 15 is formed from a plurality of plies of plain woven glass cloth each approximately 0.1 mm thick. These plies are superimposed and intersect with one another at 45°, i.e. the direction of their respective filaments are mutually at an angle of 45°, and are impregnated with an epoxy resin known by the trade name VITEX 211.

As has been mentioned, the binder which impregnates the fibrous material is advantagously firm and solid and must be an electrical insulator. It is also necessary for its nature to be such that it can easily be made to adhere on the one hand to the metal of the flanges and on the other hand to the rubber in which the reinforcement is embedded. For this reason epoxy resins, such as that known by the trade name VIPOX 52, are particularly suitable but it must be clearly understood that the invention is not restricted to the use of such resins.

Nor is the invention restricted to the use of glass and any electrically insulating and mechanically strong fibre may be used.

In the embodiment shown in FIG. 2, the flange is formed from two collars 16 and 17 whose general planes are perpendicular to a recess formed in one and a corresponding protuding part of the other. The reinforcement 2, which is fanned out radially at the end of the hose, is grasped between the two collars 16 and 17 and adheres firmly to both of them.

The walls of the collars 16 and 17 which are adjacent the reinforcement 2 and which face one another are coated with an insulating layer 18 identical to the layer 15 of the embodiment of FIG. 1. A metal hoop 19 is positioned over the junction of the two collars 16 and 17. Its function is on the one hand to prevent a hump of rubber from forming and on the other to protect the reinforcement 2 from the external medium. The inside wall of the hoop 9 is coated with an insulating layer 20 identical to the layer 18.

Each collar contains openings 21 and 22 which lie in line and through which can pass attachment bolts for attaching adjacent hose sections together. To protect the reinforcement 2 from the external medium, and if desired to allow such attachment bolts to be electrically insulated from the flange, bushes 23 are placed in the openings, straddling the junction between the collars 16 and 17. These bushes are produced by moulding a polyimide resin known by the trade name VIMYDE 4, in which long glass fibres have been dispersed.

A hose 10 meters long, having an inside diameter of 200 mm and a reinforcement formed by two plies of metal cables, each end of which was provided with a flange similar to that shown in FIG. 2 but without the insulating layers 18,19 and 20, was found to have an electrical resistance of $6.10^{-3}$ ohms. The same hose with the flanges covered with layers 18,19 and 20 produced simply from an expoxy resin had an electrical resistance of 1 ohm. The same hose with one end provided with a flange of the kind illustrated by the embodiment and with the other end provided with an identical flange but without the layers 18, 19 and 20 was found to have an electrical resistance of 150,000 ohms at a DC voltage of 100 volts.

I claim:

1. A flexible hose having a rubber body and a metal connecting flange at each end of said body, said rubber body being strengthened by a reinforcement comprising continuous metal elements extending from an overlapping relationship with one said end flange to an overlapping relationship with the other said end flange and embedded in said body, wherein the entire surfaces of said flanges situated facing said overlapping metal elements of said reinforcement are covered with an insulating layer formed from a glass cloth having high mechanical strength and high electrical resistance and from a firm binder of high electrical resistance comprising epoxyresin, said insulating layer adhering to said metal surfaces of said flanges and to said overlapping reinforcing metal elements embedded in said rubber body of the hose.

2. A flange according to claim 1, wherein said layer of glass cloth consists of a plurality of plies which are superimposed and having filaments whose respective axes are at an angle of 45°.

* * * * *

UNITED STATES PATENT AND TRADEMARK OFFICE
CERTIFICATE OF CORRECTION

PATENT NO. : 4,225,158
DATED : September 30, 1980
INVENTOR(S) : Daniel Puechavy

It is certified that error appears in the above—identified patent and that said Letters Patent is hereby corrected as shown below:

On the cover sheet Insert:

-- (30) Foreign Application Priority Data
    February 21, 1977    France    77.05003 --.

Signed and Sealed this

Twenty-third Day of December 1980

[SEAL]

Attest:

SIDNEY A. DIAMOND

Attesting Officer    Commissioner of Patents and Trademarks